United States Patent [19]

Morris et al.

[11] Patent Number: 5,251,503

[45] Date of Patent: * Oct. 12, 1993

[54] ELECTRO-MECHANICAL POWER CONTROLLER FOR A GEAR SHIFT MECHANISM

[75] Inventors: Robert L. Morris, Livonia; Andrew L. Bartos, Clarkston, both of Mich.

[73] Assignee: General Motors Corporation, Detroit, Mich.

[*] Notice: The portion of the term of this patent subsequent to Sep. 29, 2009 has been disclaimed.

[21] Appl. No.: 902,159

[22] Filed: Jun. 22, 1992

Related U.S. Application Data

[63] Continuation-in-part of Ser. No. 758,019, Sep. 12, 1991, Pat. No. 5,150,629.

[51] Int. Cl.⁵ .................... F16H 59/10; G05G 11/00
[52] U.S. Cl. .................................. 74/337.5; 74/335; 74/572
[58] Field of Search ............... 74/335, 572, 337.5, 74/473 R; 310/74

[56] References Cited

U.S. PATENT DOCUMENTS

| | | | |
|---|---|---|---|
| 2,157,592 | 5/1939 | Casler | 74/335 |
| 3,790,831 | 2/1974 | Morreale | 310/74 |
| 4,049,985 | 9/1977 | Sudler | 310/74 X |
| 4,550,625 | 11/1985 | Martin et al. | 74/337.5 X |
| 4,563,605 | 1/1986 | Gerber | 310/74 |
| 4,938,088 | 7/1990 | Langley et al. | 74/335 |
| 5,150,629 | 9/1992 | Morris et al. | 74/337.5 |

*Primary Examiner*—Allan D. Herrmann
*Attorney, Agent, or Firm*—Donald F. Scherer

[57] ABSTRACT

An electro-mechanical controller for a transmission selector in a synchronized countershaft transmission, includes a selector shaft which is driven linearly and rotatably by a power actuator mechanism to provide gear selection within the countershaft transmission. A selector rod is coupled with the selector shaft through a connection that provides compliance and damping therebetween. The selector rod has a finger mechanism which is selectively connectible with synchronizers in the transmission to provide the desired gear selection. The selector shaft and selector rod are controlled in both linear and rotatable motion by translating mechanisms in the actuator mechanism to thereby control the selector rod in the gear selection positions and in a neutral condition.

2 Claims, 7 Drawing Sheets

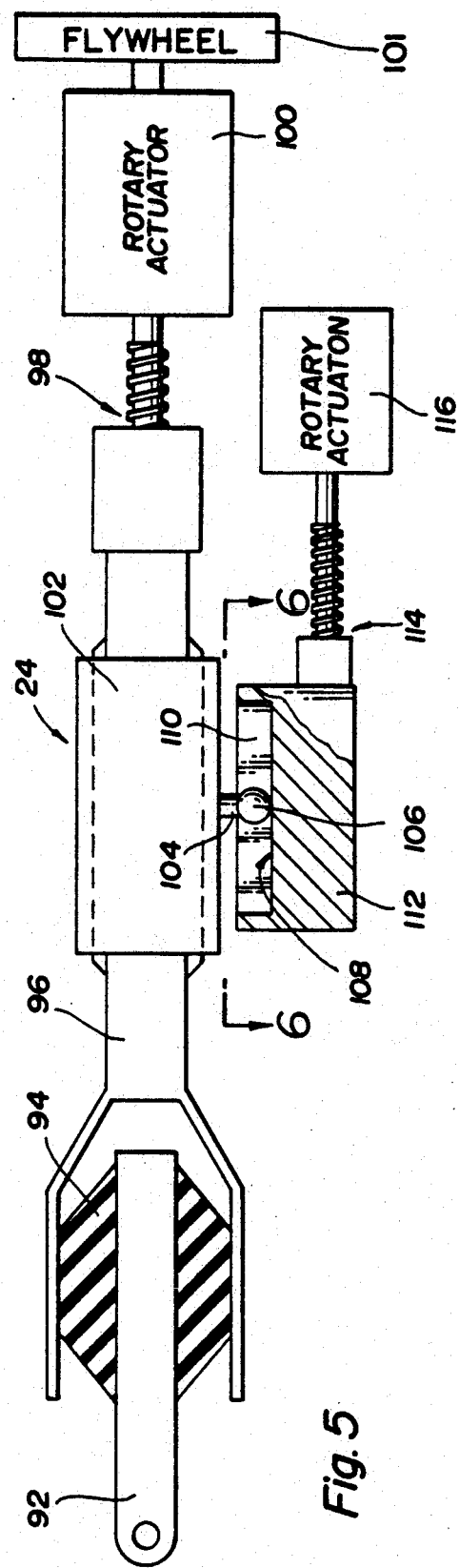
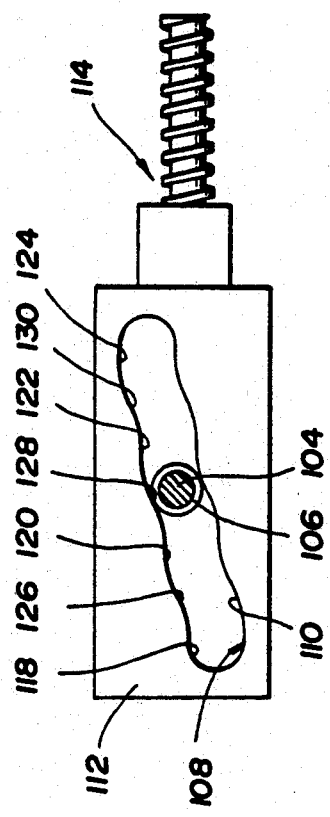
Fig. 5
Fig. 6

INDEX CAM PERFORMANCE

COUPLING PERFORMANCE - WITHOUT DAMPING

ELECTRO-MECHANICAL POWER CONTROLLER FOR A GEAR SHIFT MECHANISM

This is a Continuation-in-Part of U.S. application Ser. No. 07/758,019, filed Sep. 12, 1991 now U.S. Pat. No. 5,150,629.

BACKGROUND OF THE INVENTION

This invention relates to shift controls for synchronized countershaft transmissions, and more particularly, to assisting mechanisms for such controls, and specifically to a single selector rod type shifter having an electro-mechanical controller for establishing both linear and rotary motion of the selector rod.

The basic elements of a shift mechanism as it applies to a synchronized countershaft transmission require two types of force to be imposed on the main shift rail to execute a gear change. An axial force along the axis of the shift rail is required to disengage the original gear ratio and provide engagement force on the synchronizer of the newly selected gear ratio. This linear axial force is the only force necessary for "straightline" shifts such as 1-2, 3-4 and 5-6.

When "crossover" shifts are made, such as 2-3 or 4-5, a rotational force is also required to switch over from the original synchronizer (i.e., 1-2 the 3-4 synchronizer). The shift actuator applies these forces to the main shift rail.

Prior art mechanisms constrain the main shift rail to move through a rectangular path when making a crossover shift, such as a 2-3 shift. This type of path is difficult to follow rapidly because it requires an axial acceleration and deceleration to move from a second gear position to the neutral position, followed by a rotational acceleration and deceleration to move from the 1-2 synchronizer to the 3-4 synchronizer, and finally an axial acceleration and deceleration to move from the neutral position to the third gear position. In addition, it is required that precise timing be maintained between the axial and rotational movements in order to follow the rectangular path. These requirements constrain the speed of an actuator that follows this path.

SUMMARY OF THE INVENTION

In the present invention, an elastomeric coupling is disposed to provide compliance and damping between a shift actuator and a selector rod. This allows the shift actuator to operate in as fast a manner as possible by allowing the shift actuator to follow a smooth path. There is only one acceleration and deceleration required to move from the second gear position to the third gear position and the need for precise timing is no longer required, such that the rotational acceleration and deceleration can begin at the same time as the axial movement. Thus, there is no time lost in waiting for the axial movement to reach the neutral condition. These features reduce the time required to permit a ratio interchange between second gear and third gear or between fourth gear and fifth gear. The elastomeric coupling also provides for energy storage and release during a shift sequence or gear ratio interchange.

Also included in the present invention is a flywheel mechanism rotatable with the shift actuator to provide another energy storage mechanism which is operable to store and release energy during appropriate portions of the shift sequence. As will become apparent from the following description of the preferred embodiment, the elastomeric coupling will provide energy storage when the selector rod is constrained from linear movement, while the flywheel will store energy when the selector rod is moving linearly. The elastomeric coupling will release energy during selector rod movement and the flywheel will release energy during times when the selector rod is constrained from moving linearly. Thus, it should be appreciated that these energy storage mechanisms are complementary.

It is an object of this invention to provide an improved electro-mechanical control in a gear selector mechanism for a synchronized countershaft transmission, wherein two rotary input devices provide linear and rotary motion through a compliant coupling to a single selector shaft which is operable to control the gear selection within the countershaft transmission, and further wherein an energy storage mechanism provides for the storage and release of energy during a ratio interchange.

It is another object of this invention to provide an improved actuator control mechanism for a control mechanism has a single gear selector shaft drivingly connected with a transmission gear selector rod for controlling the linear movement of the gear selector rod to select gear ratios and the rotation of the selector rod movement in a neutral condition and wherein a compliant coupling is operatively connected between the gear selector shaft and gear selector rod to permit controlled motion differential between the gear selector shaft and the gear selector rod during a ratio interchange within the transmission, and further wherein a flywheel is provided to store energy when the selector rod is moving linearly and to release the stored energy when the selector rod is constrained from linear movement during gear selection.

It is yet another object of this invention to provide an improved actuator control mechanism for providing gear selection and ratio interchange for a synchronized countershaft transmission, wherein a pair of complementary energy storage mechanisms are operable to store and release energy during a ratio interchange to improve the stability of the transmission synchronous shifting.

These and other objects and advantages of the present invention will be more readily apparent from the following description and drawings.

DESCRIPTION OF THE DRAWINGS

FIG. 5 is a diagrammatic representation of an actuator mechanism providing the desired movements for shifting the transmission gear selection mechanism.

FIG. 6 is a view taken along line 6—6 of FIG. 5 depicting a portion of the actuator mechanism.

DESCRIPTION OF THE PREFERRED EMBODIMENT

Figure 1:
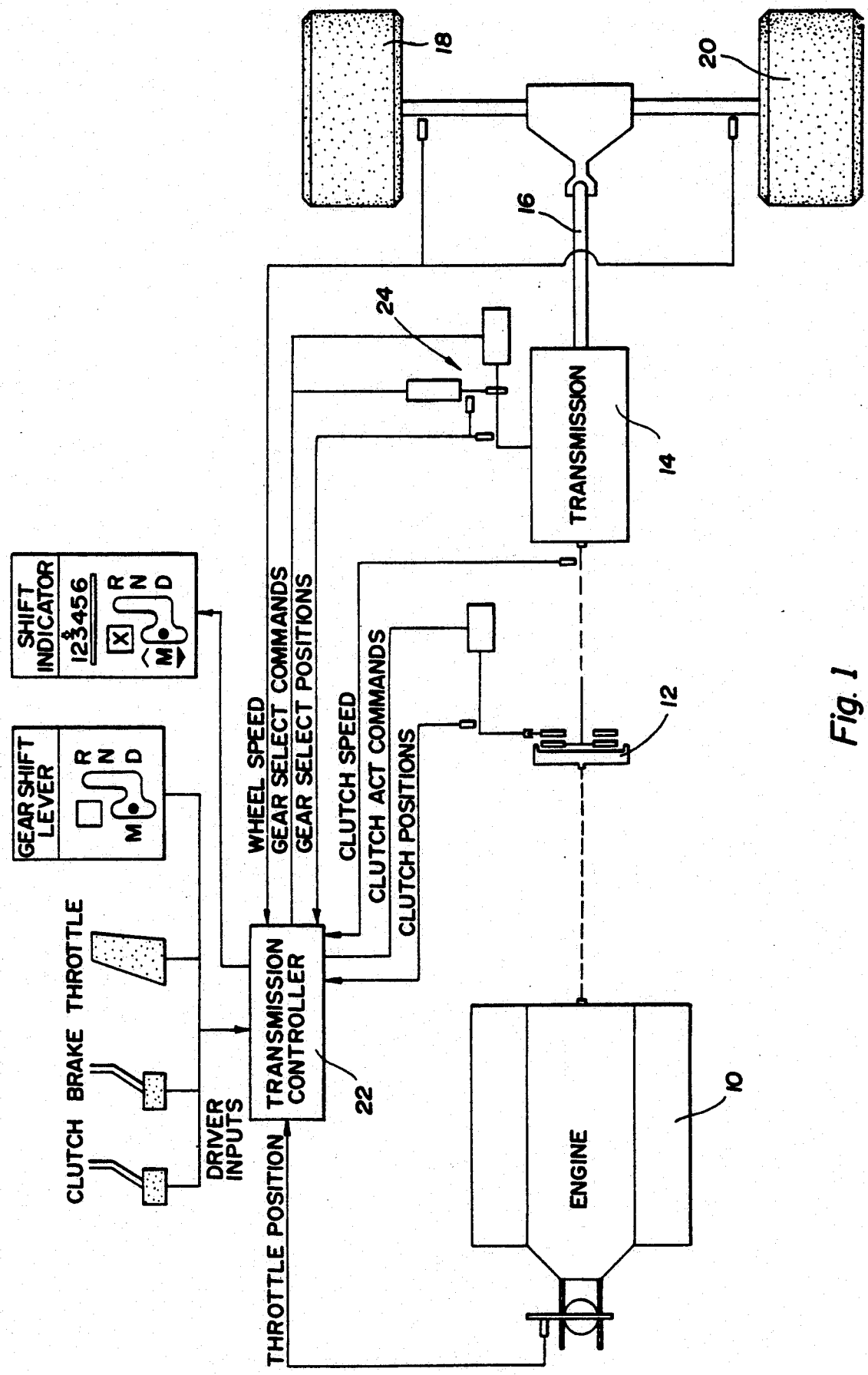
FIG. 1 is a diagrammatic representation of a vehicle powertrain system incorporating the present invention.
Figure 2:
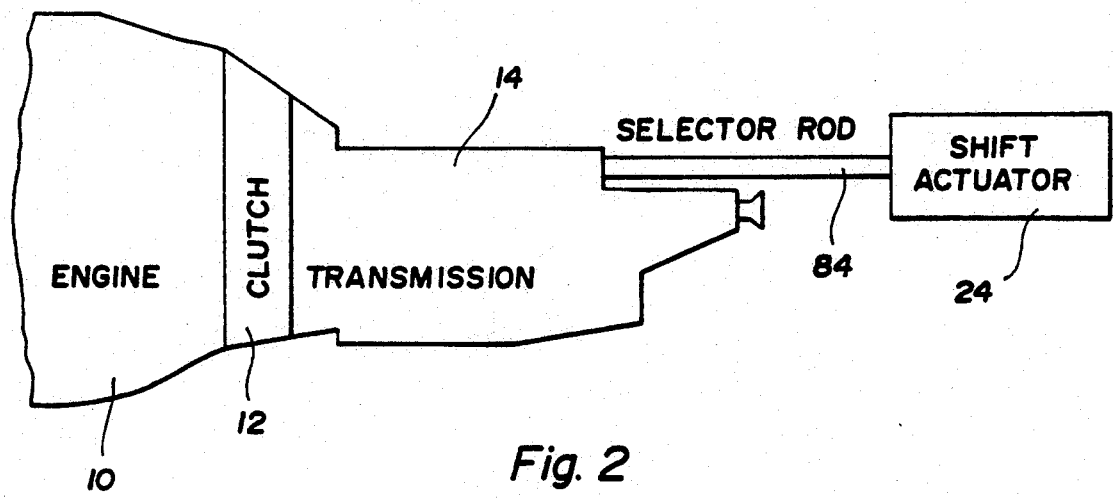
FIG. 2 is a diagrammatic representation of a transmission and shift actuator.

Referring to the drawings, wherein like characters represent the same or corresponding parts throughout the several views, there is seen in FIG. 1 a powertrain and control mechanism for a vehicle having an engine 10, a clutch 12, a transmission 14, a driveline and differential 16, and a pair of drive wheels 18 and 20.

The engine 10 is coupled with the clutch 12 which, in turn, is coupled to the transmission 14 in a conventional manner. The transmission 14 is effective to vary the speed and torque relationship between the engine 10 and the driveline 16 to thereby provide various operating ranges for the vehicle in a well known manner. The clutch 12 and transmission 14 are controlled in actuating and in gear shifting by a conventional transmission controller 22 which receives various performance signals, such as engine throttle, engine speed, wheel speed, clutch position, transmission selection and clutch speed.

The transmission control 22 provides output signals based on the input signals to control actuation of the clutch 12 and to control ratio interchanges through an actuator 24 on the transmission 14. The actuator 24 provides feedback signals to the transmission controller 22 to provide the controller 22 with the current operating condition of the transmission.

The transmission controller 22 also has some driver or operator inputs, such as a clutch pedal, brake pedal, throttle pedal and gear shift lever, which permit the driver to control the transmission shifting and vehicle operation. The gear shift lever is operable to provide either automatic transmission shifting or manual transmission shifting.

During automatic shifting, the transmission controller 22 will evaluate the input signals and deem the most appropriate time and vehicle speed for ratio interchanges. During manual shifting in the forward ratios, the operator will move the selector lever to the "M" position and then shift the lever either up or down, to indicate the desired shift interchange. A shift indicator is provided to inform the driver of the selected gear position and to indicate what change has been requested. If the shift lever is moved upward, an upshift will occur, and if moved downward, a downshift will occur.

Figure 3:
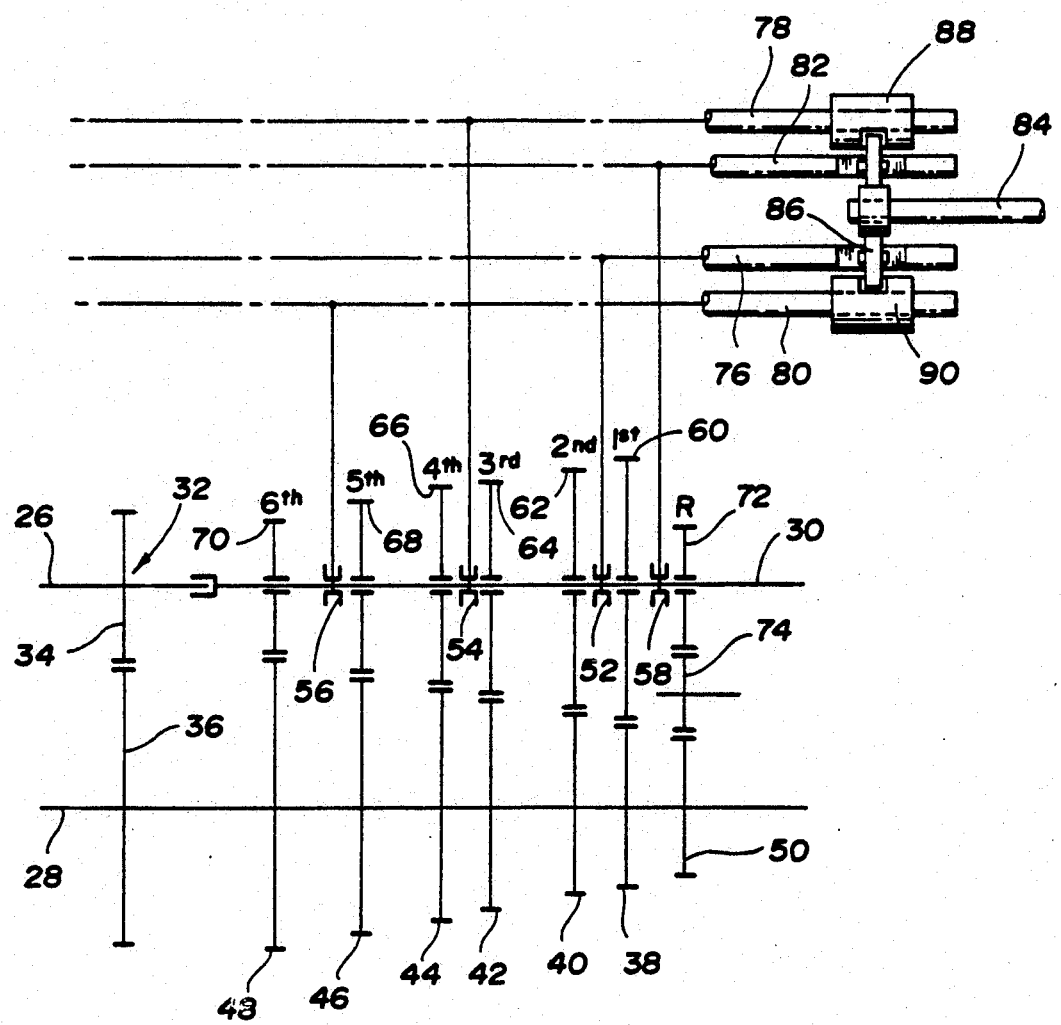
FIG. 3 is a diagrammatic representation of a transmission selector mechanism and transmission gear schematic.

The transmission 14 is shown diagrammatically in FIG. 3 as a 6-speed synchronized countershaft transmission. The transmission has an input shaft 26, a countershaft 28, an output shaft 30. The input shaft 26 is drivingly connected to the countershaft 28 through a head gear set 32 incorporating a drive gear 34 and a driven gear 36. Also drivingly connected to the countershaft 28 is a plurality of ratio gears including a first gear 38, a second gear 40, a third gear 42, a fourth gear 44, a fifth gear 46 and a sixth gear 48. A reverse gear 50 is also drivingly connected with the countershaft 28.

The output shaft 30 has drivingly connected therewith a plurality of conventional synchronizers including a 1-2 synchronizer 52, a 3-4 synchronizer 54, a 5-6 synchronizer 56 and a reverse synchronizer 58. The output shaft 30 has a plurality of ratio gears rotatably mounted thereon which are selectively connectible to the output shaft 30 for manipulation of the synchronizers 52-58.

Synchronizer 52 is effective to selectively connect one of a first gear 60 and a second gear 62 with the output shaft 30. The gears 60 and 62 are disposed in meshing relation with the gears 38 and 40, respectively. Synchronizer 54 is effective to selectively connect third gear 64 and fourth gear 66 with the output shaft 30. These gears 64 and 66 respectively mesh with gears 42 and 44. The synchronizer 56 is effective to selectively connect fifth gear 68 and sixth gear 70 with the output shaft 30. The gears 68 and 70 respectively mesh with gears 46 and 48. Synchronizer 58 is effective to selectively connect a reverse output gear 72 with the output shaft 30. The gear 72 is drivingly connected with the gear 50 through a reverse idler gear 74.

The synchronizer 52 is controlled in movement between the gear 60 and 62 by a 1-2 shift or selector rail 76. In the position shown in FIG. 3, the synchronizer 52 is in the neutral condition. The 1-2 selector rail 76 is moved rightward to connect the gear 60 with the output shaft 30 and thus establish the first or lowest speed ratio. If the 1-2 selector rail 76 is moved leftward from the neutral condition, the gear 62 is selectively drivingly connected with the output shaft 30 to thereby establish the second forward speed ratio.

The synchronizers 54, 56 and 58 are operated by respective shift or selector rails 78, 80 and 82. The 3-4 selector rail 78 controls the 3-4 shifting, the 5-6 selector rail 80 controls the 5-6 shifting and the reverse selector rail 82 controls the reverse shifting. The construction of these shift rails and synchronizer arrangements is well known and it is believed that those skilled in the art will be familiar with the operation such that a more detailed description is not required.

The selector rails 76-82 are controlled in their axial movements by a selector rod 84 and a selector finger 86. The selector rod 84 is moved rotatably in a neutral condition to select the appropriate selector rail through the selector finger 86 after which the selector rod 84 is moved linearly to move the appropriate selector rail, as desired.

Figure 4:
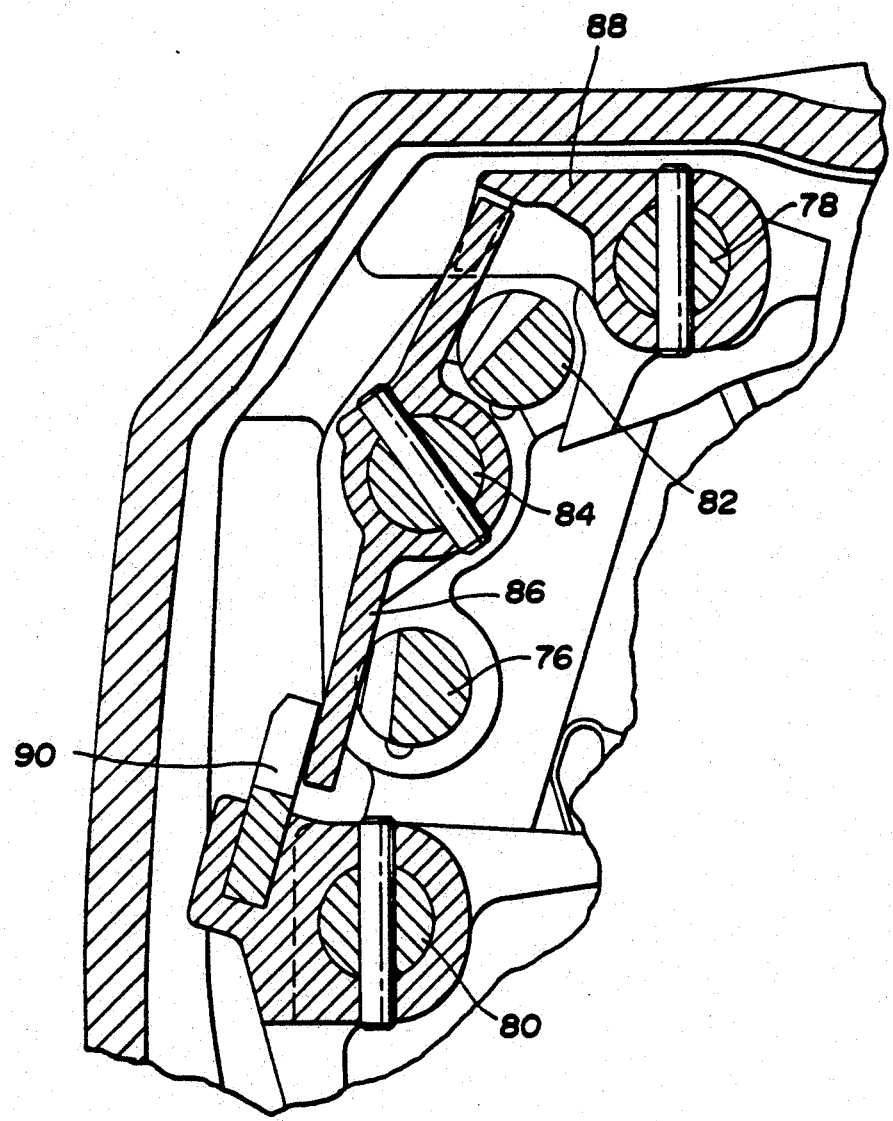
FIG. 4 is a cross-sectional elevational view of a portion of a transmission incorporating a selector mechanism for a transmission having six forward speeds and a reverse speed.

A more detailed picture of the selector mechanism is shown in FIG. 4. In FIG. 4, the selector rod 84 is shown in the neutral position with the selector finger 86 engaging a gate 88 which is secured to the 3-4 selector rail 78. As described above, each synchronizer 52, 54 and 56 is operable to select one, to the exclusion of all others, of a pair of gear ratios between the input shaft 26 and the output shaft 30 through linear movement of their respective shift rails 78, 80 and 82.

As is readily apparent from a showing in FIG. 4, if the selector rod 84 is rotated counterclockwise from the position shown, the selector finger 86 will engage the 1-2 selector rail 76. Clockwise rotation of the selector rod 84 will cause the selector finger 86 to initially engage a gate 90 which is connected with the 5-6 selector rail 80. Further clockwise rotation of the selector rod 84 will cause the selector finger 86 to disengage the gate 90 and engage the reverse selector rail 82.

From FIG. 4, it can be seen that the selector finger 86 can engage only one selector rail at a time and therefore only one synchronizer can be moved by the axial movement of the selector rod 84. The selector rod 84 extends out of the transmission 14 and is connected with the actuator 24 at a selector rod connection 92, as seen in FIG. 5. The selector rod connection 92 and selector rod 84 are connected through an elastomeric compliant coupling 94 with a selector shaft 96 which is an element in the shift actuator 24.

The selector shaft 96 is connected directly with a conventional ball nut and screw actuator 98 which responds to a conventional power actuator 100 to establish linear or axial motion of the selector shaft 96. The actuator 100 has connected therewith a flywheel or energy storage device 101. The selector shaft 96 has slidably disposed thereon and splined thereto a coupling 102. The coupling 102 has secured thereto a rod 104 and a cam follower 106. The cam follower 106 is disposed in a cam track 108 having a cam surface 110 formed in a block 112. The block 112 is controlled in linear motion by a conventional ball nut and screw actuator 114 which is driven by a conventional power actuator 116. The power actuators 100 and 116 are preferably rotary power actuators, such as conventional stepper motors. These devices, in combination with the ball nut and screw actuators 98 and 114, will permit precise control and movement at the selector shaft 96.

The present invention provides two significant improvements to shift actuator mechanisms in the form of energy storage and release mechanisms and the use of the cam follower 106 and cam track 108. The energy storage is provided by the elastomeric coupling 94 and by the flywheel 101.

The elastomeric coupling will store energy when the actuator 24 is moving linearly and the selector rod 84 is constrained from moving due to the interaction of the synchronizers in the transmission. This stored energy is released to provide rapid linear movement of the selector rod 84 when the synchronization is complete. The flywheel will store energy when the selector rod 84 is moving linearly under the action of the rotary actuator 100. The linear movement takes place when backlash within the system including the synchronizers is being take up.

The flywheel releases energy, which is then stored in the coupling 94, when the selector rod 84 is constrained from moving linearly. The selector rod 84 can be constrained from moving when the synchronizers undergo a conventional blocking action during which time the oncoming gear member is accelerated to provide synchronization or speed matching in a well known manner.

The energy storage and release availability provided by the flywheel permits the rotary actuator 100 to increase the amount of energy transmitted to the coupling 94 in a given time period. This significantly shortens the synchronization time without increasing the energy source of the rotary actuator 100.

As best seen in FIG. 6, when the block 112 is driven linearly by the ball nut and screw actuator 114, the cam follower 106 and therefore rod 104 will move transverse to the block 112 as determined by the cam surface 110. The cam surface 110 has a plurality of dwell sections 118, 120, 122 and 124. The dwell sections 118 and 120 are connected by a ramp 126, the dwell sections 120 and 122 are connected by a ramp 128 and the dwell sections 122 and 124 are connected by a ramp 130.

When the cam follower 106 is disposed in any of the dwell sections 118-124, the selector shaft 96 can be moved axially by the power actuator 100 without affecting the position of the block 112. This will result in axial or linear movement of the selector rod 84 to thereby control movement between straight line shift positions 1-2, 3-4, 5-6 or reverse. The dwell section 118 will permit 1-2 shifting, the dwell section 120 will permit 3-4 shifting and dwell 122 will permit 5-6 shifting and dwell section 124 will permit reverse shifting.

The linear motion of the block 112 will cause the cam follower 106 to engage and follow the respective ramps 126-130. While the cam follower 106 is moving along a ramp, the coupling 102 and therefore selector shaft 96 is rotated. This will result in rotary motion of the selector rod 84 in the neutral condition. The ramp 126 is effective to control the selector finger 86 for movement in neutral between the 3-4 selector rail 78 and the 1-2 selector rail 76. The ramp 128 controls rotary movement in neutral between the 3-4 selector rail 78 and the 5-6 selector rail 80. The ramp 130 controls rotary movement in neutral of the selector finger 86 between the 5-6 selector rail 80 and the reverse selector rail 82.

Assuming that the transmission is in the third ratio and the actuator mechanism 24 is called upon to shift to fourth gear, the power actuator 100 will be driven to cause linear motion of the selector shaft 96 and, through the elastomeric coupling 94, the selector rod 84 such that the 3-4 selector rail 78 is moved linearly thereby causing the synchronizer 54 to release gear 64 and connect gear 66. The system will not have any external constraints which will interfere with this linear motion and the elastomeric coupling 94 will undergo very little stress.

However, when the power actuators 116 and 100 are acting simultaneously, as on a 4-5 crossover shift, the elastomeric coupling 94 will be stressed. On a 4-5 crossover shift, the power actuator 116 causes the block 112 to move linearly so that the cam follower 106 is driven by the ramp 128 to effect rotary motion of the selector shaft 96.

At the beginning of this shift, the selector finger 86 is secured to the 3-4 selector rail 78 and is constrained from rotating out of such engagement. Therefore, the selector rod 84 cannot rotate and the elastomeric coupling 94 will accommodate the differential motion which occurs between the selector shaft 96 and the selector rod 84. When the 3-4 selector rail 78 reaches its neutral condition, the selector rod 84 is free to rotate and will do so in response to the energy stored in the elastomeric coupling 94.

The power actuator 100 during this time is operating to drive the selector shaft 96 linearly. Linear movement is freely permitted during the time period that the selector finger 86 is moving the 3-4 selector rail 78 from the fourth position to the neutral position. Upon reaching the neutral position, the linear motion continues while the selector finger 86 is rotated to engage the 5-6 selector rail 80. During this time, the selector shaft 96 continues to be driven linearly by the actuator 100.

However, during synchronization the selector rod 84 is constrained from linear motion such that the elastomeric coupling 94 will be stressed to permit the differential motion required. The flywheel will also add energy to the coupling 94 during this instant. When synchronization is completed, the shift motion will continue and the energy stored within the elastomeric coupling 94 will be transmitted through the selector rod 84 along with the continued linear motion caused by the power actuator 100.

Figure 7:
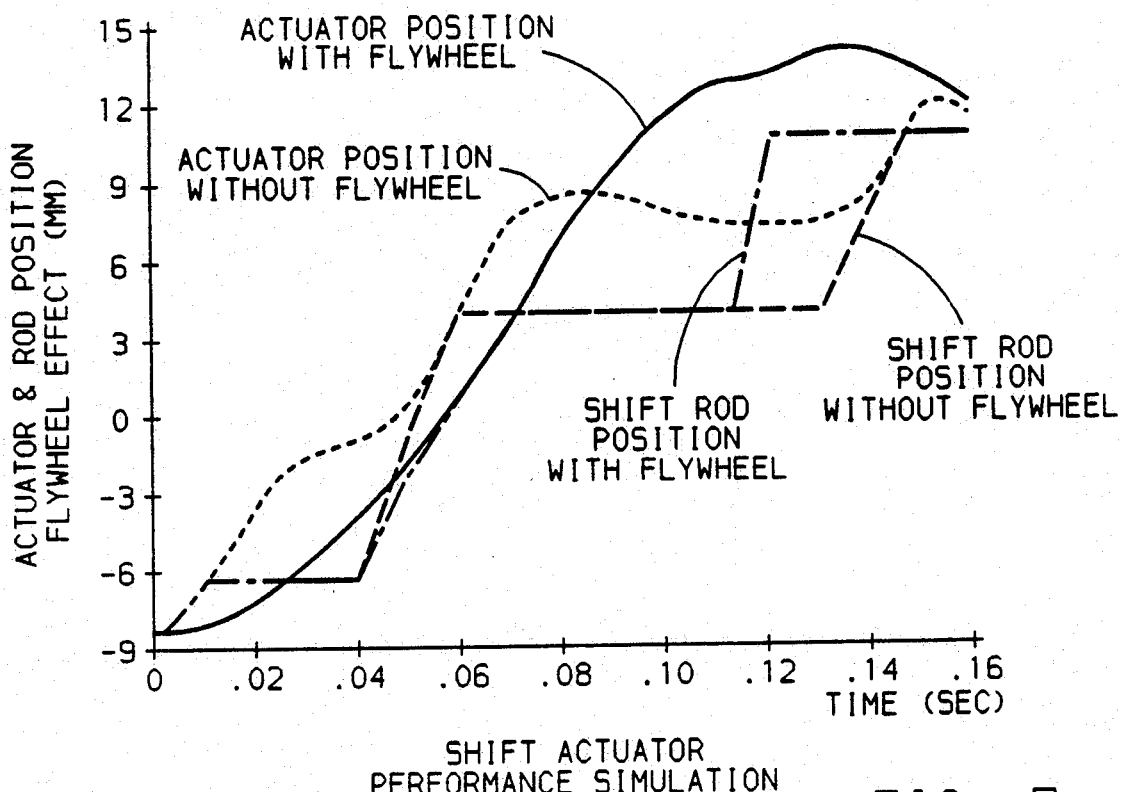
FIGS. 7-11 are curves depicting various operating parameters and mechanisms vs. time which show the improvements achieved with the present invention.
Figure 8:
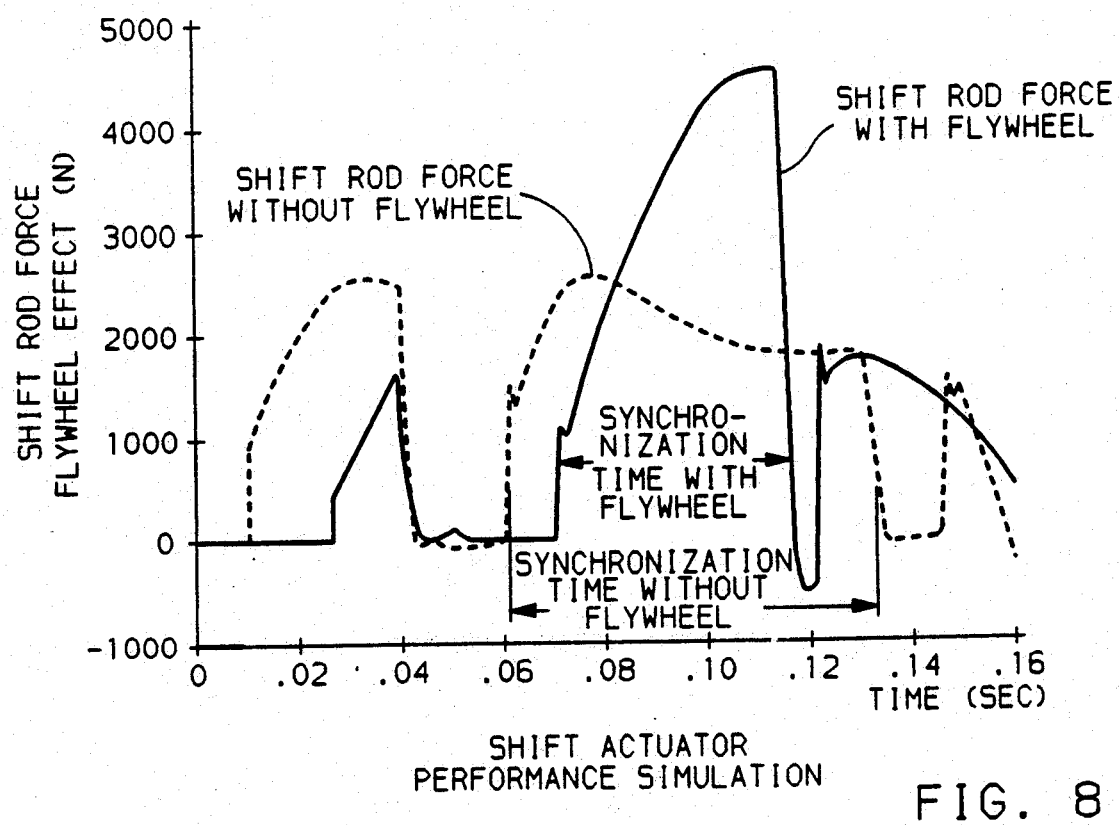

The advantage obtained by utilizing the flywheel is best seen in FIGS. 7 and 8 which are computer simulations of a high speed 2-3 shift. As seen in FIGS. 7 and 8, the desired shift rod position is achieved with less time lapse when the flywheel 101 is included as compared to a similar mechanism without the flywheel. It is also apparent from the curves, and particularly in FIG. 8, that the synchronization time of the transmission is less with the flywheel than a similar mechanism without the flywheel. In the computer simulation shown in FIG. 8, the mechanism utilizing the flywheel 100 begins synchronization slightly after the nonflywheel mechanism but completes the synchronization prior to the nonflywheel actuator. The system utilizing the flywheel reduces the synchronization time by approximately 50%.

It is also evident from FIG. 8 that the force levels obtained using the flywheel are considerably greater than a nonflywheel system. This permits the use of a smaller motor in the rotary actuator without sacrificing shift performance. The combination of energy storage mechanisms provided by the coupling 94 and the flywheel 101 provide for a reduced package size, such that the actuator mechanism will not unduly increase the overall real estate required by the transmission and control mechanisms.

Figure 9:
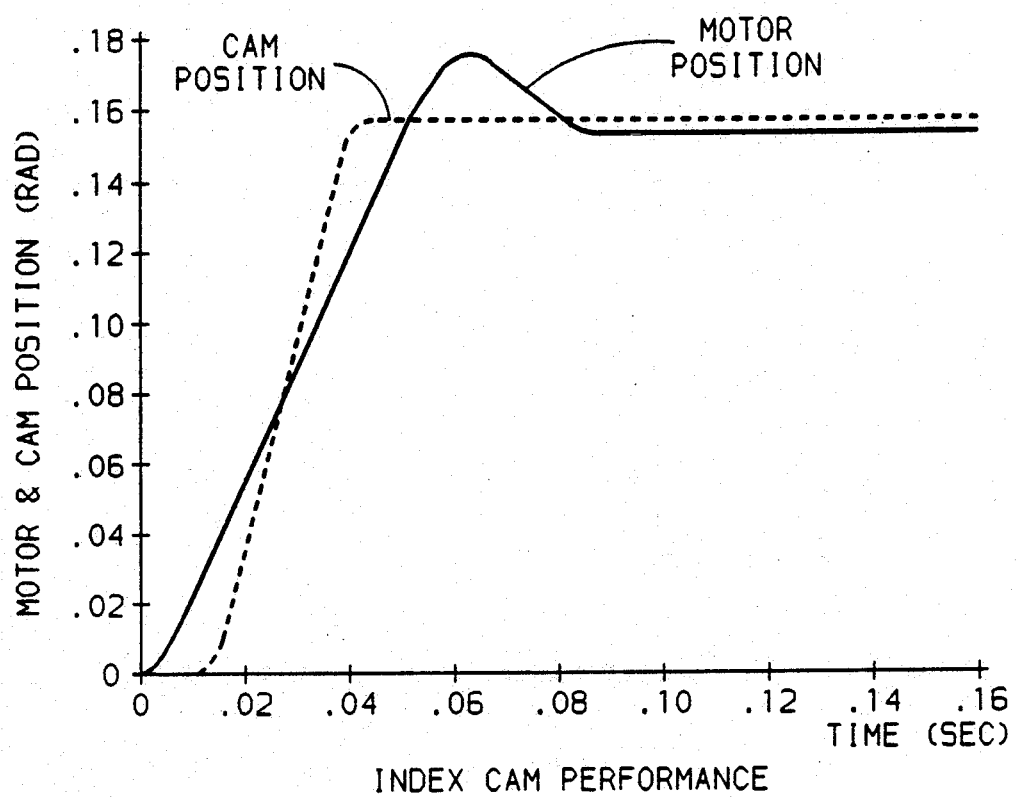
Figure 10:
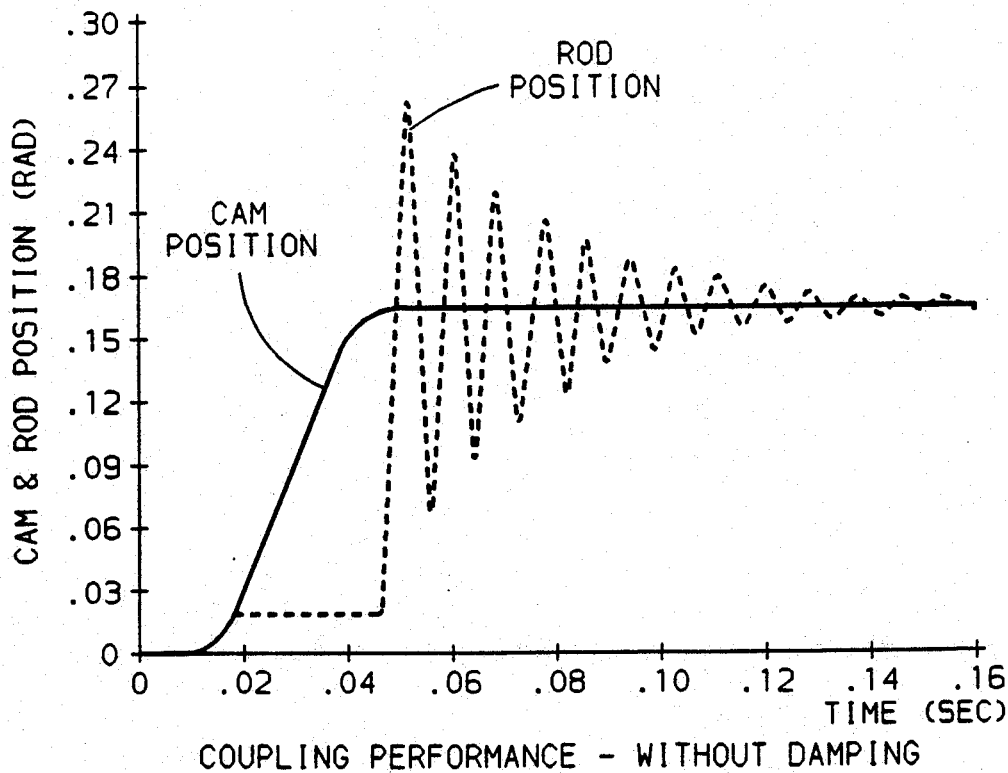
Figure 11:
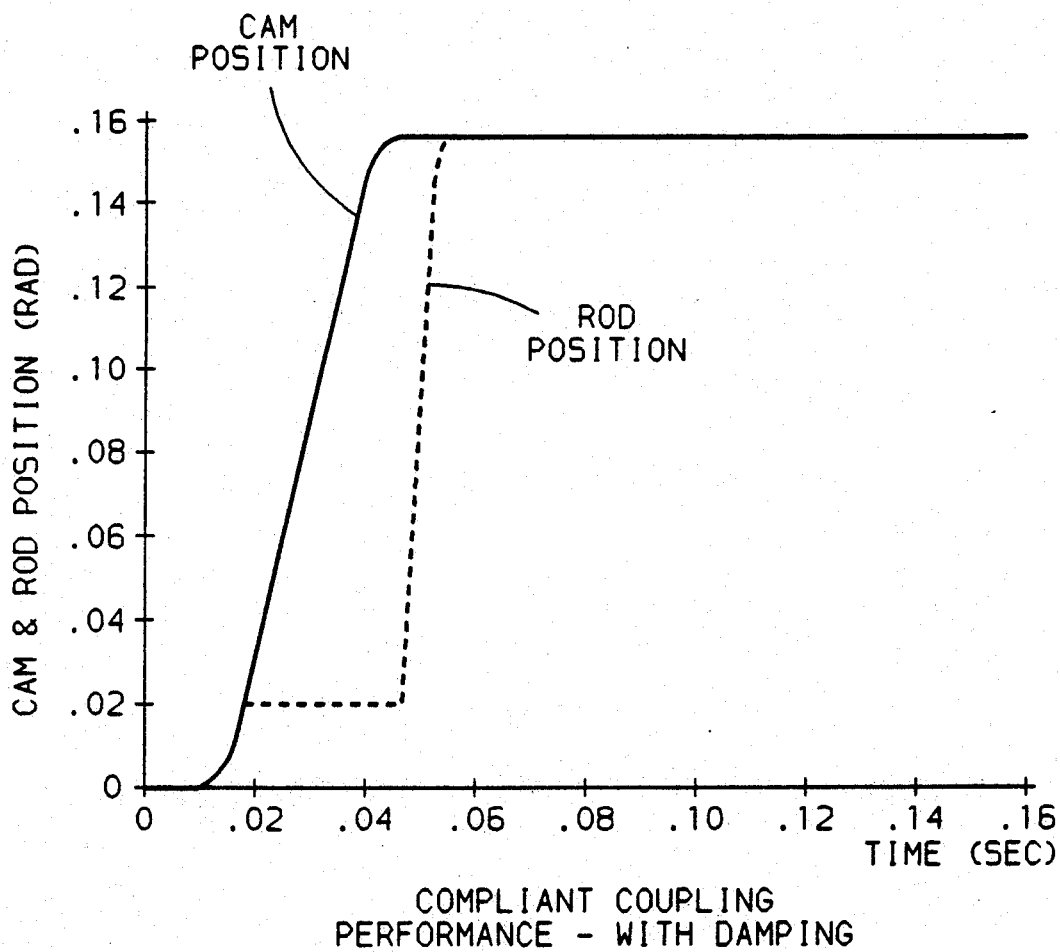

The indexing cam mechanism provided by the cam follower 106 and cam track 108 along with the damping characteristics of the elastomeric coupling 94 provide for the advantages seen in FIGS. 9-11. FIG. 9 shows that the indexing cam mechanism will provide for accurately positioning the actuator shaft even though the motor operation may not start and stop at a specific position. It can be seen in FIG. 9 that the motor position requires a longer time period to achieve the desired end position than is obtained by the cam. Also it is seen that the motor, in order to reach the desired position in a minimum time period, will result in overshoot while the indexing cam is always a precise position due to the dwell periods designed into the cam.

FIGS. 10 and 11 depict the advantage of damping in the compliant elastomeric couplings which are utilized in the present invention. FIG. 11 illustrates the performance of the elastomeric coupling having a proper level of damping. The index cam will twist the elastomeric coupling to the desired rod position during the initial axial movement when the rod is constrained from rotating. When the axial movement reaches the neutral position, the rod is free to rotate and it is therefore urged rapidly to its required position to engage the shift rail with the proper shift fork. The damping characteristics of the elastomeric coupling prevents overshoot of the cam position.

FIG. 10 depicts a coupling mechanism that has little or no damping in the coupling as would be the case of a steel spring mechanism. With such devices, it is possible for the shift rod to be mispositioned such that shift times must be increased in order to accommodate any mispositioning.

As should be evident from the above description, the elastomeric coupling 94 will provide the required compliance between the selector shaft 96 and the selector rod 84 to permit the power actuators 100 and 116 to be operated simultaneously during a crossover shift in the transmission; and in conjunction with the flywheel 101 will provide for efficient storage and release of energy during a ratio interchange and gear selection. This eliminates the need or requirement that the actuator 100 be utilized to return the off-going shift rail to neutral prior to rotary movement by the power actuator 100 through the neutral condition and selection of the on-coming shift rail, and then to further provide linear motion by the power actuator 100 to select the on-coming gear ratio. Thus, what is eliminated is the first linear deceleration of the power actuator 100 and the second linear acceleration of the power actuator 100.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. An electro-mechanical controller in a transmission gear selector having a plurality of forward gear ratios, a reverse gear ratio and a neutral condition, said gear selector being movable linearly for selection of the gear ratios, and rotatably for movement in the neutral condition between gear ratios; said controller comprising: a first rotary drive means for providing a gear selection input including a first drive translating means for converting rotary motion to linear motion; a selector rod drivingly connected with said first drive translating means for selective movement thereby to provide linear movement thereof for controlled selection of the forward and reverse gear ratios; a second rotary drive means for providing movement in said neutral condition including a cam member comprising a plurality of ramp portions and a dwell portion between adjacent ramp portions; cam follower means operatively connected with said selector rod and drivingly connected with said cam member and cooperating with said ramp portions for enforcing rotary movement of said selector rod to provide movement in said neutral condition and cooperating with said dwell portion for permitting linear movement of said first drive translating means for gear ratio selection; compliant coupling means operatively connected between said first drive translating means and said selector rod for providing compliance and damping therebetween in response to input motion; and flywheel means rotatable with said first rotary drive means for selectively storing and releasing energy during controlled selection of the forward and release gear ratios.

2. A power controller in a transmission gear selector having a plurality of pairs of forward gear ratios, including a 1-2 pair and a 3-4 pair, a reverse gear ratio and a neutral condition between each pair of forward gear ratios, said gear selector being movable linearly for individual selection of one of each of the pairs of gear ratios, and rotatably for movement in the neutral condition between the pairs of gear ratios; said controller comprising: a first power actuator means for providing a gear selection input including a first drive translating means for delivering output linear motion; a selector rod drivingly connected with said first drive translating means for selective movement thereby to provide linear movement thereof for controlled selection of one of the 1-2 pair of forward gear ratios; a second power actuator means for providing movement in said neutral condition including a cam member comprising a plurality of ramp portions and a dwell portion between adjacent ramp portions; cam follower means operatively connected with said selector rod and drivingly connected with said cam member and cooperating with said ramp portions for enforcing rotary movement of said selector rod to provide movement in said neutral condition between said 1-2 pair and said 3-4 pair of forward gear ratios and cooperating with said dwell portion for permitting linear movement of said first drive translating means for gear ratio selection; compliant coupling means operatively connected between said first drive translating means and said selector rod for providing compliance and damping therebetween; and energy storage means operatively connected with said first power actuator means for selectively storing energy therefrom and releasing energy to said compliant coupling means during the individual selection of the gear ratios.

* * * * *